(12) United States Patent
Wang et al.

(10) Patent No.: US 12,529,122 B2
(45) Date of Patent: Jan. 20, 2026

(54) LOW-COST HOT-ROLLED STEEL PLATE FOR HIGH TEMPERATURE ENAMELING, AND MANUFACTURING METHOD THEEFOR

(71) Applicant: BAOSHAN IRON & STEEL CO., LTD., Shanghai (CN)

(72) Inventors: Shuangcheng Wang, Shanghai (CN); Quanshe Sun, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 132 days.

(21) Appl. No.: 18/262,810

(22) PCT Filed: Feb. 9, 2022

(86) PCT No.: PCT/CN2022/075614
§ 371 (c)(1),
(2) Date: Jul. 25, 2023

(87) PCT Pub. No.: WO2022/171112
PCT Pub. Date: Aug. 18, 2022

(65) Prior Publication Data
US 2024/0309481 A1    Sep. 19, 2024

(30) Foreign Application Priority Data
Feb. 9, 2021  (CN) .......................... 202110175137.0

(51) Int. Cl.
*C22C 38/00*  (2006.01)
*B32B 15/01*  (2006.01)
(Continued)

(52) U.S. Cl.
CPC ................ *C21D 9/46* (2013.01); *B32B 15/01* (2013.01); *C21D 1/02* (2013.01); *C21D 1/18* (2013.01);
(Continued)

(58) Field of Classification Search
CPC ... C21D 9/46; C21D 1/18; C21D 1/84; C21D 1/02; C21D 6/002; C21D 6/005;
(Continued)

(56) References Cited

U.S. PATENT DOCUMENTS

| | | | | |
|---|---|---|---|---|
| 2008/0318029 A1* | 12/2008 | Nishimura | .............. | C23C 30/00 428/332 |
| 2010/0040872 A1* | 2/2010 | Murakami | .............. | C22C 38/04 148/648 |
| 2025/0003040 A1* | 1/2025 | Wang | .................... | C21D 6/008 |

FOREIGN PATENT DOCUMENTS

| | | |
|---|---|---|
| CN | 1659298 A | 8/2005 |
| CN | 101517115 A | 8/2009 |

(Continued)

OTHER PUBLICATIONS

Notice of Office Action from The Korean IP Office, dated Feb. 25, 2025.

(Continued)

*Primary Examiner* — Michael E. La Villa
(74) *Attorney, Agent, or Firm* — Lei Fang, Esq.; Smith Tempel Blaha LLC

(57) ABSTRACT

A low-cost hot-rolled steel plate for high temperature enameling. The chemical composition in mass percentage of the plate contains mainly: C: 0.03-0.12%, Si: 0.1-0.5%, Mn: 0.3-1.5%, P: 0.03-0.10%, Al: 0.02-0.10%, Cr: 0.01-0.20%, Cu: 0.01-0.30%, N: 0.007-0.020%, and B: 0.0006-0.003%, and further satisfies: P×(N−14×B/11)×10³>0.3. A manufacturing method for manufacturing such low-cost hot-rolled steel plate.

6 Claims, 1 Drawing Sheet

(51) Int. Cl.
| | |
|---|---|
| C21D 1/02 | (2006.01) |
| C21D 1/18 | (2006.01) |
| C21D 1/84 | (2006.01) |
| C21D 6/00 | (2006.01) |
| C21D 7/06 | (2006.01) |
| C21D 8/00 | (2006.01) |
| C21D 8/02 | (2006.01) |
| C21D 9/46 | (2006.01) |
| C22C 33/04 | (2006.01) |
| C22C 38/02 | (2006.01) |
| C22C 38/04 | (2006.01) |
| C22C 38/06 | (2006.01) |
| C22C 38/16 | (2006.01) |
| C22C 38/18 | (2006.01) |
| C22C 38/20 | (2006.01) |
| C22C 38/22 | (2006.01) |
| C22C 38/24 | (2006.01) |
| C22C 38/28 | (2006.01) |
| C22C 38/32 | (2006.01) |
| C22C 38/38 | (2006.01) |
| C22C 38/54 | (2006.01) |
| C23D 5/00 | (2006.01) |
| C23D 5/02 | (2006.01) |

(52) U.S. Cl.
CPC .............. *C21D 1/84* (2013.01); *C21D 6/002* (2013.01); *C21D 6/005* (2013.01); *C21D 6/008* (2013.01); *C21D 7/06* (2013.01); *C21D 8/005* (2013.01); *C21D 8/0205* (2013.01); *C21D 8/0226* (2013.01); *C21D 8/0263* (2013.01); *C21D 8/0278* (2013.01); *C22C 33/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/16* (2013.01); *C22C 38/18* (2013.01); *C22C 38/20* (2013.01); *C22C 38/22* (2013.01); *C22C 38/24* (2013.01); *C22C 38/28* (2013.01); *C22C 38/32* (2013.01); *C22C 38/38* (2013.01); *C22C 38/54* (2013.01); *C23D 5/00* (2013.01); *C23D 5/02* (2013.01); *C21D 2211/002* (2013.01); *C21D 2211/005* (2013.01); *C21D 2211/009* (2013.01); *Y02P 10/20* (2015.11); *Y10T 428/12951* (2015.01); *Y10T 428/12972* (2015.01); *Y10T 428/26* (2015.01)

(58) Field of Classification Search
CPC .... C21D 6/008; C21D 8/0205; C21D 8/0226; C21D 8/0263; C21D 8/005; C21D 8/0278; C21D 2211/005; C21D 2211/009; C21D 2211/002; C21D 7/06; C22C 38/001; C22C 38/002; C22C 38/02; C22C 38/04; C22C 38/06; C22C 38/20; C22C 38/32; C22C 38/16; C22C 38/18; C22C 38/54; C22C 38/38; C22C 38/22; C22C 38/24; C22C 38/28; C22C 33/04; Y02P 10/20; Y10T 428/12951; Y10T 428/12972; Y10T 428/26; C23D 5/00; C23D 5/02; B32B 15/01
See application file for complete search history.

(56) References Cited

FOREIGN PATENT DOCUMENTS

| | | |
|---|---|---|
| CN | 102251192 A | 11/2011 |
| CN | 102766822 A | 11/2012 |
| CN | 105088065 A | 11/2015 |
| CN | 106480368 A | 3/2017 |
| CN | 107916371 A | 4/2018 |
| CN | 108624817 A | 10/2018 |
| DE | 10221486 A1 | 9/2003 |
| EP | 2065482 A1 * | 6/2009 |
| EP | 2145971 A1 | 1/2010 |
| JP | 2005330510 A | 12/2005 |
| JP | 2013249502 A | 12/2013 |
| KR | 20080080193 A | 9/2008 |

OTHER PUBLICATIONS

International Search Report for PCT/CN2022/075614 dated Apr. 13, 2022.
International Written Opinion for PCT/CN2022/075614 dated Apr. 13, 2022.
First Office Action for the priority CN application 202110175137.0 with English translation, Sep. 7, 2022.
First Search Report for the priority CN application 202110175137.0 with listed references Dec. 8, 2021.

* cited by examiner

LOW-COST HOT-ROLLED STEEL PLATE FOR HIGH TEMPERATURE ENAMELING, AND MANUFACTURING METHOD THEEFOR

CROSS-REFERENCE TO RELATED APPLICATIONS

This application is a 371 U.S. National Phase of PCT International Application No. PCT/CN2022/075614 filed on Feb. 9, 2022, which claims priority to a Chinese Application No. 202110175137.0 filed on Feb. 9, 2021, the contents of above all documents are incorporated by reference herein in their entireties.

TECHNICAL FIELD

The present invention relates to a steel material and its manufacturing method, particularly to a low-cost hot-rolled steel plate for high temperature enameling, and its manufacturing method.

BACKGROUND

In recent years, with the development of enamel industry and the rapid progress of new energy technology, large-capacity enameled water heater tanks have become increasingly popular in the market and can be mainly applied in commercial electric water heaters, air energy water heaters, and pressurized solar water heaters.

When such large-capacity water heater tanks are produced, special high temperature glazes and matching high enameling temperature processes with the enameling temperature being usually up to 870-950° C. are typically required. Therefore, the requirements for steel plates used are correspondingly increased, and the steel plate is required to have high temperature resistance while ensuring enameling property, and to still have sufficient yield strength after being fired at high temperatures to guarantee the performance of the final products.

In the prior art, some researchers have achieved some research results regarding steel for enameling for water heater tanks.

The Chinese patent document with the Publication No. CN101812630A, published on Aug. 25, 2010, discloses a hot-rolled high-strength enameled steel plate for deep drawing and a manufacturing method therefor. Such an enameled steel plate adopts a chemical composition comprising: C: 0.02-0.10%, Si≤0.10%, Mn: 0.05-1.00%, P≤0.05%, S: 0.005-0.035%, Al: 0.01-0.10%, N≤0.015%, Ti≤0.10%, and the balance being Fe and inevitable impurities.

The Chinese patent document with the Publication No. CN103540845A, published on Jan. 29, 2014, also discloses a hot-rolled sheet enameled steel, which adopts a chemical composition comprising: C: 0.02-0.07%, Si≤0.05%, Mn: 0.10-0.50%, P≤0.020%, S≤0.010%, Ti: 0.04-0.10%, Al: 0.02-0.08%, N≤0.008%, with the balance being Fe and inevitable impurities, and Ti/C=1.0-1.5.

The Chinese patent document with the Publication No. CN102181805A, published on Sep. 14, 2011, discloses a steel plate used for enameling for a water heater tank and a thin slab continuous casting and rolling production method. The steel plate for enameling for a water heater tank adopts a chemical composition comprising: C: 0.03-0.10%, Mn: 0.15-0.40%, Si≤0.06%, S: 0.004-0.040%, P≤0.15%, Al: 0.03-0.05%, N: 0.002-0.008%, Ti: 0.02-0.10%, and the balance being Fe and inevitable impurities.

It can be seen that the above-mentioned prior art exhibits a common characteristic: Ti is added in the composition. Ti is a commonly used alloying element in steel for enameling and can form compounds such as TiC and TiN with C and N, acting as hydrogen trapping sites to resist fish scaling. Moreover, TiC phases also play a role of precipitation strengthening.

However, it should be noted that the design of adding the Ti element not only leads to relatively high in production cost, but also causes coarsening and growth of TiC precipitates during high temperature enameling, significantly weakening the strengthening effect. The yield strength of the steel plate will be greatly lowered after high temperature enamel firing at above 870° C., typically below 300 MPa, which cannot satisfy design requirements of the large-capacity water heater tanks.

Based on the above shortcomings in the prior art, the present invention aims to provide a low-cost hot-rolled steel plate for high temperature enameling, which has lower production costs and does not require the addition of expensive alloying elements such as Ti, Nb, or V, while still achieving good enameling adaptability. The low-cost hot-rolled steel plate for high temperature enameling still has excellent mechanical properties after high temperature enameling, meeting various demands of steel for high temperature enameling for large-capacity water heater tanks. The present invention holds significant practical significance.

SUMMARY

One of the objectives of the present invention is to provide a low-cost hot-rolled steel plate for high temperature enameling, which has lower production costs and does not require the addition of expensive alloying elements such as Ti, Nb, or V, while still achieving good enameling adaptability. The low-cost hot-rolled steel plate for high temperature enameling still has excellent mechanical properties after high temperature enameling, meeting various demands of steel for high temperature enameling for large-capacity water heater tanks. It holds significant practical significance.

To achieve the above-mentioned objective, the present invention provides a low-cost hot-rolled steel plate for high temperature enameling, wherein in addition to Fe and inevitable impurities, the hot-rolled steel plate further comprises a chemical composition in mass percentage as follows:
  C: 0.03-0.12%, Si: 0.1-0.5%, Mn: 0.3-1.5%, P: 0.03-0.10%, Al: 0.02-0.10%, Cr: 0.01-0.20%, Cu: 0.01-0.30%, N: 0.007-0.020%, and B: 0.0006-0.003%;
  the low-cost hot-rolled steel plate for high temperature enameling does not contain Ti, Nb, and V; and
  the chemical composition further satisfies the condition: $P \times (N - 14 \times B/11) \times 10^3 > 0.3$; and in a calculation, P, N, and B are respectively substituted with the numerical value before the percent sign in the mass percentage of the corresponding chemical element. For example, when the mass percentage of P is 0.10%, the numerical value substituted into the formula is 0.10.

Preferably, the low-cost hot-rolled steel plate for high temperature enameling in the present invention comprises the chemical composition in mass percentage as follows:
  C: 0.03-0.12%, Si: 0.1-0.5%, Mn: 0.3-1.5%, P: 0.03-0.10%, Al: 0.02-0.10%, Cr: 0.01-0.20%, Cu: 0.01-0.30%, N: 0.007-0.020%, B: 0.0006-0.003%, and the balance being Fe and other inevitable impurities;
  wherein the chemical composition further satisfies the condition: $P \times (N - 14 \times B/11) \times 10^3 > 0.3$; and in the calculation, P, N, and B are respectively substituted with the numerical value before the percent sign in the mass percentage of the corresponding chemical element. For example, when the mass percentage of P is 0.10%, the numerical value substituted into the formula is 0.10.

In the present invention, compared to previous enameled steel for water heaters, the present invention creatively adopts a composition system with high content of P, N and B and avoids the addition of expensive alloying elements such as Ti, Nb, and V, so that the production costs can be effectively reduced.

In the low-cost hot-rolled steel plate for high temperature enameling in the present invention, the design principles of each chemical element are as follows:

C: Carbon is an important strengthening element in steel and can dissolve in ferrite or form pearlite under certain conditions, thereby strengthening the matrix and improving the yield strength of the steel plate. However, it should be noted that since no carbide forming elements such as Ti, Nb, and V are added in the present invention, a high carbon content can lead to excessive pearlite formation during enameling, resulting in the generation of a large amount of gases such as CO. This can cause defects such as bubbles and pinholes of an enamel layer, which severely affect the enameling quality. Therefore, in the low-cost hot-rolled steel plate for high temperature enameling in the present invention, the mass percentage of the C element is limited at 0.03-0.12%.

Si: Si element can play a role in solid solution strengthening in steel. Additionally, Si can improve the high temperature deformation resistance and the softening resistance of the steel plate during high temperature enameling. However, it should be noted that excessive content of the Si in steel can not only decrease its plasticity but also affect the adhesion between the steel plate and the enamel layer. Therefore, in the low-cost hot-rolled steel plate for high temperature enameling in the present invention, the mass percentage of the Si element is limited at 0.1-0.5%.

Mn: Mn element is one of the most cost-effective alloying elements capable of improving the strength of the steel and is an important element for achieving high strength of the steel in the present invention. However, it should be noted that the Mn element can further play roles in expanding austenite phase region and lowering the Ac3 temperature, which is detrimental to the enameling properties of the steel plate. This is because the austenite phase has a higher hydrogen solubility than the ferrite phase, making it more easily results in fish scaling after being cooled. Therefore, excessive addition of Mn into steel should be avoided. Based on this, in the low-cost hot-rolled steel plate for high temperature enameling in the present invention, the mass percentage of the Mn element is limited at 0.3-1.5%.

P: P is an important strengthening element. Its solid solution strengthening effect can still be fully utilized after high temperature enameling, which is crucial to ensure that the steel in the present invention still has high yield strength after high temperature enameling. However, it should be noted that excessive addition of P into steel should be avoided. When the content of the P element is too high, the plasticity, toughness, and welding property of the steel will be reduced. Therefore, in the low-cost hot-rolled steel plate for high temperature enameling in the present invention, the mass percentage of the P element is limited at 0.03-0.10%.

Al: Al is a strong deoxidizing element. In order to maintain a low content of O in steel, Al is usually adopted for deoxidization in low-carbon and medium-carbon steels. Additionally, the Al element dissolved in the steel can combine with free N to precipitate AlN. The precipitation temperature of AlN is high, which can refine the austenite grains. In the present invention, the steel plate still needs to have high yield strength under the condition of air cooling after high temperature enameling. The high temperature grain refinement effect of AlN allows the steel plate to have fine grain structure after high temperature enameling, thereby fully utilizing the fine grain strengthening mechanism. Therefore, in the low-cost hot-rolled steel plate for high temperature enameling in the present invention, the mass percentage of the Al element is limited at 0.02-0.10%.

Cr and Cu: adding an appropriate amount of Cr and Cu elements to the steel is beneficial for surface deposition, improving the adhesion between the steel and enamel layer and enhancing the steel's resistance to fish scaling. Part of Cr in the steel can replace Fe to form an alloy carbides (Fe, Cr)3C, so that its stability is improved. Another portion of Cr can dissolve into ferrite, leading to solid solution strengthening and effectively improving the strength and hardness of the ferrite. However, it should be noted that excessive addition of the Cr and Cu elements in the steel should be avoided. High content of the Cr and Cu elements not only increases the alloy costs but also enhances the corrosion resistance of the steel, which is detrimental to the enameling adhesion during the enameling of the steel plate. Therefore, in the low-cost hot-rolled steel plate for high temperature enameling in the present invention, the mass percentage of the Cr element is limited at 0.01-0.20%, and the mass percentage of the Cu element is limited at 0.01-0.30%.

N: under normal conditions, the content of N element in steel should be kept as low as possible. However, in the present invention, a moderate amount free N is an important prerequisite for the formation of BN and AlN precipitates. Therefore, in the low-cost hot-rolled steel plate for high temperature enameling in the present invention, the mass percentage of the N element is limited at 0.007-0.020%.

B: in a technical solution of the present invention, B has very low solubility in steel. It mainly combines with free N in the steel and precipitates in the form of BN. BN preferentially precipitates at high temperature, and its precipitation temperature is higher than that of AlN. In the present invention, the BN precipitates can be used as main hydrogen trapping sites and contribute to the resistance against fish scaling during enameling. However, it should be noted that the free N in the steel will be consumed in a precipitation process of BN, which reduces the precipitation temperature of AlN and the amount of AlN precipitates, thus affecting the refinement of austenite grains caused by AlN and resulting in larger grain size. Therefore, the content of the B element in the steel should not be too high. In the low-cost hot-rolled steel plate for high temperature enameling in the present invention, the mass percentage of the B element is limited at 0.0006-0.003%.

It should be noted that, in the low-cost hot-rolled steel plate for high temperature enameling in the present invention, the P, N and B elements need to be controlled to satisfy a formula: $P \times (N-14 \times B/11) \times 10^3 > 0.3$ while the mass percentage of individual chemical elements are controlled. Through experimental research, the inventors found that when the content of the P, N, and B elements in the steel satisfy the above-mentioned relational expression, it can ensure that the reduction in the yield strength of the steel plate after high temperature enameling is within 10%, and the yield strength can still reach the level of 342 MPa or higher. This is because when such an expression is satisfied, a sufficient amount of BN precipitates can be formed as hydrogen trapping sites in the steel matrix, followed by the formation of a sufficient amount of AlN precipitates, thus fully utilizing the grain-refining effect of AlN precipitates. Particularly, after the steel plate is subjected to high temperature enameling, it can still achieve a very fine grain structure, thereby exerting the strengthening effect of fine grains. In combination with the solid solution strengthening effect the P element, it can prevent a significant decrease in yield strength of the steel plate, which is one of key innovative aspects of composition design in the present invention.

Preferably, the microstructure of the low-cost hot-rolled steel plate for high temperature enameling in the present invention is ferrite and pearlite.

Preferably, in the low-cost hot-rolled steel plate for high temperature enameling in the present invention, the average grain size of the ferrite is at grade 10-12. The fine grains ensure the full effect of grain refinement strengthening.

Preferably, the thickness of the low-cost hot-rolled steel plate for high temperature enameling in the present invention is 1.5-3.5 mm.

Preferably, in the low-cost hot-rolled steel plate for high temperature enameling in the present invention, the yield strength of the hot-rolled steel plate in its hot-rolled state is 364-410 MPa, after high temperature enameling within a temperature range of 870-950° C., a decrease in yield strength is within 10%, and a value of the yield strength is greater than or equal to 342 MPa.

Correspondingly, another objective of the present invention is to provide a manufacturing method for a low-cost hot-rolled steel plate for high temperature enameling. The manufacturing method is simple in a production process. By using this manufacturing method, the low-cost hot-rolled steel plate for high temperature enameling with good enameling adaptability can be obtained.

To achieve the above-mentioned objective, the present invention provides the above-mentioned manufacturing method for the low-cost hot-rolled steel plate for high temperature enameling, including the following steps:
(1) smelting and casting;
(2) heating;
(3) hot rolling: controlling the rough rolling temperature at above 850° C., the finish rolling start temperature at 900-1050° C., and the finish rolling end temperature at 840-900° C.;
(4) laminar cooling: controlling the cooling rate at 10-35° C./s; and
(5) coiling.

In the present invention, the casting in above-mentioned step (1) can be carried out by continuous casting or die casting, which can ensure uniform composition and good surface quality of the cast slab. In some other implementations, die casting can also be used, a die-cast steel ingot needs to be rolled into a steel slab by a blooming mill.

Correspondingly, during the hot rolling process of above-mentioned step (3), the heated cast slab can be subjected to rough rolling to form an intermediate slab firstly, and then subjected to finish rolling to obtain the desired slab.

In step (4) of the present invention, the slab is water cooled to the coiling temperature in step (5) at a cooling rate of 10-35° C./s, and then air cooled to room temperature. By adopting such a controlled rolling and cooling process in the present invention, a fine ferrite grain structure can be obtained, ensuring the full effect of grain refinement strengthening, and improving the yield strength of the steel sheet, thereby further enhancing the performance of the steel plate, and realizing the production of the low-cost hot-rolled steel plate for high temperature enameling, which is suitable for a large-capacity water heater tank.

Preferably, in the above-mentioned step (2), the heating temperature is controlled at 1150-1260° C.

Preferably, in the above-mentioned step (5), the coiling temperature is controlled at 550-680° C.

In the above-mentioned technical solutions, the coiling temperature is controlled at 550-680° C., because the coiling within such a temperature range is not only beneficial to the refinement of ferrite grains, but also beneficial to the uniform precipitation of BN phase. This results in the low-cost hot-rolled steel plate for high temperature enameling with excellent mechanical properties and resistance to fish scaling.

Compared to the prior art, the low-cost hot-rolled steel plate for high temperature enameling, and the manufacturing method therefor in the present invention have the following advantages and beneficial effects:

The present invention creatively adopts a composition system with high content of P, N, and B and avoids the addition of expensive alloying elements such as Ti, Nb, and V. In addition, in the present invention, by rational design of the chemical composition and optimization of the controlled rolling and cooling process after rolling, the present invention achieves the production of low-cost hot-rolled steel plate for high temperature enameling suitable for large-capacity water heater tanks. This allows for the production of low-cost hot-rolled steel plate for high temperature enameling with good enameling adaptability while reducing the production costs.

After high temperature enameling within the temperature range of 870-950° C., a decrease in yield strength of the low-cost hot-rolled steel plate for high temperature enameling is only within 10%, and the yield strength can still reach 342 MPa or higher. Therefore, the hot-rolled steel plate retains excellent mechanical properties, meeting various requirements of steel for high temperature enameling for large-capacity water heater tanks. This has significant practical implications.

DETAILED DESCRIPTION

Figure 1:
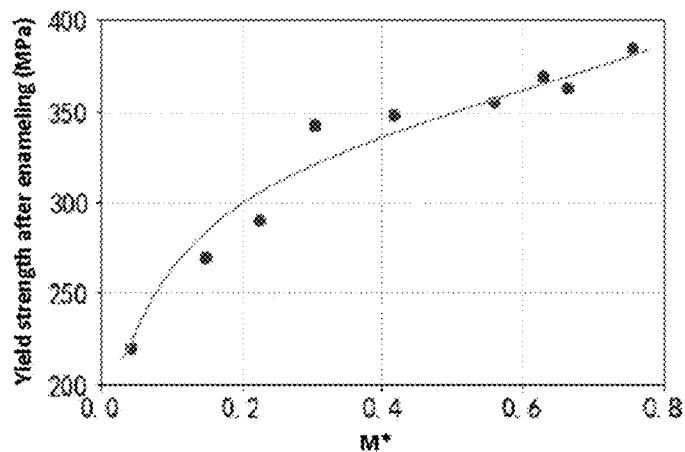
FIG. 1 shows a relationship between the defined chemical element synergy M* and the yield strength of the low-cost hot-rolled steel plate for high temperature enameling after enameling, in the present invention.

The low-cost hot-rolled steel plate for high temperature enameling, and the manufacturing method therefor in the present invention will be further explained and described below in conjunction with the accompanying drawings and specific embodiments. However, the explanation and description do not constitute improper limitations on the technical solutions of the present invention.

Examples 1-6 and Comparative Examples 1-3

The low-cost hot-rolled steel plates for high temperature enameling in Examples 1-6 and comparative steel plates in Comparative Examples 1-3 are prepared according to the following steps:
(1) Smelting and Casting: Performing smelting and casting according to chemical compositions shown in Table 1 below. The smelted molten steel is then subjected to vacuum degassing and continuous casting to obtain a continuous cast slab;
(2) Heating: The obtained continuous cast slab is heated, and the heating temperature is controlled at 1150-1260° C.;
(3) Hot rolling: Controlling the rough rolling temperature at above 850° C., the finish rolling start temperature at 900-1050° C., and the finish rolling end temperature at 840-900° C.;
(4) Laminar cooling: Performing laminar water cooling, and controlling the cooling rate at 10-35° C./s; and
(5) Coiling: Controlling the coiling temperature at 550-680° C.

Table 1 presents the mass percentages of various chemical elements in the low-cost hot-rolled steel plates for high temperature enameling in Examples 1-6 and the comparative steel plates in Comparative Examples 1-3.

TABLE 1

(the balance being Fe and other inevitable impurities)

| Serial Number | C (wt %) | Si (wt %) | Mn (wt %) | P (wt %) | Al (wt %) | Cr (wt %) | Cu (wt %) | N (wt %) | B (wt %) | M* |
|---|---|---|---|---|---|---|---|---|---|---|
| Example 1 | 0.06 | 0.21 | 1.2 | 0.06 | 0.035 | 0.06 | 0.1 | 0.012 | 0.0012 | 0.63 |
| Example 2 | 0.05 | 0.38 | 1.4 | 0.05 | 0.05 | 0.02 | 0.12 | 0.017 | 0.0015 | 0.75 |
| Example 3 | 0.04 | 0.13 | 0.9 | 0.03 | 0.04 | 0.08 | 0.11 | 0.012 | 0.0015 | 0.30 |
| Example 4 | 0.08 | 0.22 | 0.76 | 0.08 | 0.06 | 0.07 | 0.06 | 0.008 | 0.0022 | 0.42 |
| Example 5 | 0.09 | 0.25 | 0.8 | 0.07 | 0.06 | 0.05 | 0.055 | 0.013 | 0.0028 | 0.66 |
| Example 6 | 0.11 | 0.45 | 0.52 | 0.04 | 0.09 | 0.19 | 0.28 | 0.015 | 0.0008 | 0.56 |
| Comparative Example 1 | 0.06 | 0.15 | 0.65 | 0.04 | 0.032 | 0.06 | 0.07 | 0.005 | 0.001 | 0.15 |
| Comparative Example 2 | 0.05 | 0.2 | 0.72 | 0.02 | 0.025 | 0.05 | 0.05 | 0.004 | 0.0015 | 0.04 |
| Comparative Example 3 | 0.07 | 0.35 | 0.68 | 0.03 | 0.041 | 0.07 | 0.08 | 0.01 | 0.002 | 0.22 |

Note:
M* = P × (N − 14 × B/11) × $10^3$, and in the calculation, P, N, and B in the formula are respectively substituted with the numerical value before the percent sign in the mass percentage of the corresponding chemical element.

Table 2 presents the specific process parameters of the low-cost hot-rolled steel plates for high temperature enameling in Examples 1-6 and the comparative steel plates in Comparative Examples 1-3 in the above-mentioned manufacturing steps.

TABLE 2

| Serial Number | Thickness t (mm) | Step (2) Heating temperature (° C.) | Step (3) Rough rolling temperature (° C.) | Step (3) Finish rolling start temperature (° C.) | Step (3) Finish rolling end temperature (° C.) | Step (4) Cooling rate (° C./s) | Step (5) Coiling temperature (° C.) |
|---|---|---|---|---|---|---|---|
| Example 1 | 2.5 | 1230 | 1050 | 1000 | 855 | 20 | 610 |
| Example 2 | 1.5 | 1220 | 880 | 910 | 860 | 32 | 680 |
| Example 3 | 2.5 | 1230 | 1060 | 1020 | 850 | 12 | 560 |
| Example 4 | 2.0 | 1180 | 1050 | 1030 | 880 | 12 | 640 |
| Example 5 | 3.0 | 1230 | 1080 | 1050 | 860 | 25 | 580 |
| Example 6 | 3.5 | 1150 | 920 | 960 | 840 | 13 | 600 |
| Comparative Example 1 | 2.5 | 1200 | 1050 | 1000 | 845 | 10 | 610 |
| Comparative Example 2 | 2.0 | 1230 | 1050 | 1030 | 850 | 8 | 620 |
| Comparative Example 3 | 1.5 | 1220 | 1010 | 1000 | 860 | 11 | 620 |

The obtained low-cost hot-rolled steel plates for high temperature enameling in Examples 1-6 and the comparative steel plates in Comparative Examples 1-3 are respectively sampled, properties of the steel plates in the Examples and comparative examples are tested to obtain test results which are listed in Table 3, and the relevant performance testing methods and procedures are described as follows:

Tensile test: an SCL233 normal-temperature tensile test machine is utilized for test based on GB/T 228.1-2010 Metallic Materials-Tensile Testing—Part 1: Method of test at room temperature, the test was conducted at a tensile speed of 3 mm/min with a JIS5 tensile test specimen.

Hole expanding test: an SCL250 cupping test machine is utilized for test based on GB/T 24524-2009 Metallic materials-Sheet and strip-Hole expanding test, wherein the test speed is 6 mm/min.

Drop-weight test: a corresponding drop-weight test apparatus is adopted for testing adhesion of enamel based on a drop-weight test method described in European standard BS EN 10209-1996; and Average grain size of ferrite: the average grain size is determined by comparing with a standard series grading chart by adopting a comparison method with the aid of a metallographic microscope, based on GB/T 6394-2017 Determination of estimating the average grain size of metal.

Table 3 presents the performance test results, microstructures and grain sizes of ferrite of the low-cost hot-rolled steel plates for high temperature enameling in Examples 1-6 and the comparative steel plates in Comparative Examples 1-3.

TABLE 3

| Serial Number | Yield strength (MPa) | Tensile strength (MPa) | Elongation A50 (%) | Hole expanding rate (%) | Microstructure | Average grain size of ferrite |
|---|---|---|---|---|---|---|
| Example 1 | 390 | 458 | 29 | 85 | ferrite + pearlite | Grade 10 |
| Example 2 | 410 | 512 | 27 | 82 | ferrite + pearlite | Grade 12 |
| Example 3 | 368 | 466 | 28 | 92 | ferrite + pearlite | Grade 10 |
| Example 4 | 364 | 460 | 29 | 90 | ferrite + pearlite | Grade 10 |
| Example 5 | 385 | 464 | 28 | 80 | ferrite + pearlite | Grade 11 |
| Example 6 | 372 | 456 | 31 | 88 | ferrite + pearlite | Grade 10 |
| Comparative Example 1 | 346 | 410 | 30 | 91 | ferrite + pearlite | Grade 9 |
| Comparative Example 2 | 320 | 385 | 33 | 98 | ferrite + pearlite | Grade 8 |
| Comparative Example 3 | 355 | 391 | 32 | 96 | ferrite + pearlite | Grade 9 |

To further demonstrate the performance of the low-cost hot-rolled steel plates for high temperature enameling in Examples 1-6 and the comparative steel plates in Comparative Examples 1-3 after enameling, it is necessary to enamel the steel plates in the Examples and the comparative examples:

Specifically, a Ferro EMP6515 high-temperature glaze is adopted to perform single-sided wet-process enameling on the steel plates in the Examples and the Comparative Examples. The enameling process was controlled at an enameling temperature of 870-950° C. with a holding time of 10 minutes, followed by air cooling to obtain the enameled steel plates in Examples 1-6 and Comparative Examples 1-3.

After the above-mentioned operations are completed, the enameled hot-rolled steel plates in Examples 1-6 and the enameled comparative steel plates in Comparative Examples 1-3 were observed and tested. After enameling, the steel plates were enabled to stand for 48 hours, no fish scaling phenomenon was observed on surfaces of the steel plates. The adhesion performance between the steel plates and enamel was verified by the drop-weight test, and the adhesion was excellent. Tensile tests were conducted to determine the yield strength of the enameled steel plates of each example and comparative sample. The test results are listed in Table 4.

Table 4 presents the performance test results of the low-cost hot-rolled steel plates for high temperature enameling in Examples 1-6 and the comparative steel plates in Comparative Examples 1-3 after enameling.

TABLE 4

| Serial Number | Yield strength (MPa) | Decrease in yield strength (%) | Fish scaling resistance | Adhesion performance |
|---|---|---|---|---|
| Example 1 | 369 | 5.4 | No fish scaling phenomenon occurs | Excellent |
| Example 2 | 385 | 6.1 | No fish scaling phenomenon occurs | Excellent |
| Example 3 | 342 | 7.1 | No fish scaling phenomenon occurs | Excellent |
| Example 4 | 348 | 4.4 | No fish scaling phenomenon occurs | Excellent |
| Example 5 | 363 | 5.7 | No fish scaling phenomenon occurs | Excellent |
| Example 6 | 355 | 4.6 | No fish scaling phenomenon occurs | Excellent |
| Comparative Example 1 | 270 | 22.0 | No fish scaling phenomenon occurs | Excellent |
| Comparative Example 2 | 220 | 31.3 | No fish scaling phenomenon occurs | Excellent |
| Comparative Example 3 | 290 | 18.3 | No fish scaling phenomenon occurs | Excellent |

It can be seen from Table 4 in conjunction with Tables 1-3 that the low-cost hot-rolled steel plates for high temperature enameling in Examples 1-6 have the thickness within a range of 1.5-3.5 mm, the yield strength in the hot-rolled state of 364-410 MPa, the tensile strength of 456-512 MPa, the elongation of 27-31%, and the hole expanding rate of 80-92%. After high temperature enameling within a temperature range of 870-950° C., the decrease in the yield strength of the steel plates in Examples 1-6 is within 10%, and the yield strength is still greater than or equal to 342 MPa. This indicates the steel plates have excellent high temperature enameling resistance. After the enameled steel plates finally obtained in Examples 1-6 were enabled to stand for 48 h, no fish scaling phenomenon was observed on the enamel surfaces. The drop-weight test confirmed the excellent adhesion between the steel plates and an enamel layer, fully meeting user requirements.

In contrast, the performance of the comparative steel plates in Comparative Examples 1-3 are significantly inferior to those of the low-cost hot-rolled steel plates for high temperature enameling in Examples 1-6. In Comparative Examples 1-3, the content of the P, N, and B elements in the steel does not satisfy the condition $P \times (N - 14 \times B/11) \times$ $10^3 > 0.3$. After high temperature enameling within the temperature range of 870-950° C., the decrease in the yield strength reaches 18% or above, and the value of the yield strength is within 220-290 MPa.

FIG. 1 shows the relationship between the defined chemical element synergy M* and the yield strength of the low-cost hot-rolled steel plate for high temperature enameling after enameling, in the present invention, where $M^* = P \times (N - 14 \times B/11) \times 10^3$.

It can be seen from FIG. 1 that in the present invention, there is an obvious correlation between the yield strength of the steel plate after enameling and the value of M*. When the value of M* is greater than 0.3, it can be ensured that the yield strength is 342 MPa or above, which satisfies the design target requirements of the product.

Figure 2:
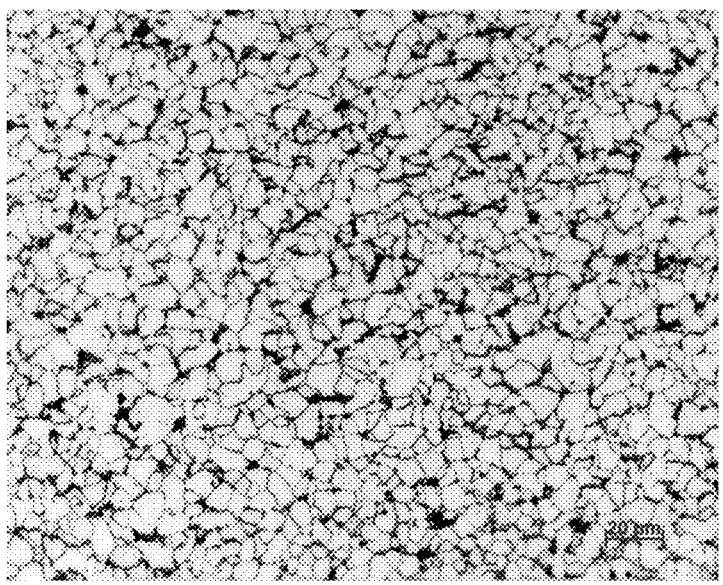
FIG. 2 is a photo of the microstructure of the low-cost hot-rolled steel plate for high temperature enameling in Example 1 of the present invention.

FIG. 2 is a photo of a microstructure of the low-cost hot-rolled steel plate for high temperature enameling in Example 1.

As shown in FIG. 2, the microstructure of the low-cost hot-rolled steel plate for high temperature enameling in Example 1 is ferrite and pearlite, and the average grain size of ferrite is at grade 10.

It should be noted that combination manners of technical features in this case are not limited to combination manners recorded in the claims of this case or combination manners recorded in the specific embodiments, and all the technical features recorded in this case can be freely combined or incorporated in any manners unless there are conflicts between them.

It should be further noted that the embodiments listed above are merely the specific embodiments of the present invention. The present invention is not limited to the above-mentioned embodiments, similar changes or variants made therewith can be directly obtained or readily envisioned from the content disclosed by the present invention by those skilled in the art so as to fall within the protection scope of the present invention.

What is claimed is:

1. A low-cost hot-rolled steel plate for high temperature enameling consisting of the following chemical composition in mass percentage:

C: 0.03-0.12%, Si: 0.1-0.5%, Mn: 0.3-1.5%, P: 0.03-0.10%, Al: 0.02-0.10%, Cr: 0.01-0.20%, Cu: 0.01-0.30%, N: 0.007-0.020%, B: 0.0006-0.003%, and the balance being Fe and other inevitable impurities;

wherein the chemical composition further satisfies the condition: $P \times (N - 14 \times B/11) \times 10^3 > 0.3$; and in the calculation, P, N, and B are respectively substituted with the numerical value before the percent sign in the mass percentage of the corresponding chemical element; and wherein the hot-rolled steel plate has a microstructure of ferrite and pearlite, and the ferrite has an average grain size at grade 10-12, as determined in accordance with GB/T 6394-2017.

2. The low-cost hot-rolled steel plate for high temperature enameling of claim 1, wherein a thickness of the hot-rolled steel plate is 1.5-3.5 mm.

3. The low-cost hot-rolled steel plate for high temperature enameling of claim 1, wherein a yield strength of the hot-rolled steel plate in its hot-rolled state is 364-410 MPa, a decrease in yield strength measured after high temperature enameling within a temperature range of 870-950° C. for 10 minutes and air cooling is within 10% relative to the yield strength of the hot-rolled steel plate, and a value of the yield strength of the steel plate after the high temperature enameling is greater than or equal to 342 MPa.

4. A manufacturing method for the low-cost hot-rolled steel plate for high temperature enameling of claim 1, comprising the following steps:

(1) smelting and casting;
(2) heating;
(3) hot rolling: controlling a rough rolling temperature at above 850° C., a finish rolling start temperature at 900-1050° C., and a finish rolling end temperature at 840-900° C.;
(4) laminar cooling: controlling a cooling rate at 10-35° C./s; and
(5) coiling.

5. The manufacturing method of claim 4, wherein in step (2), a heating temperature is controlled at 1150-1260° C.

6. The manufacturing method of claim 4, wherein in step (5), a coiling temperature is controlled at 550-680° C.

* * * * *